(12) United States Patent
Je et al.

(10) Patent No.: US 10,648,799 B2
(45) Date of Patent: May 12, 2020

(54) METHOD FOR GENERATING MONOCHROME PERMUTATION STRUCTURED-LIGHT PATTERN AND STRUCTURED-LIGHT SYSTEM USING THE METHOD THEREOF

(71) Applicant: SOGANG UNIVERSITY RESEARCH FOUNDATION, Seoul (KR)

(72) Inventors: Changsoo Je, Seoul (KR); Hyung-Min Park, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 116 days.

(21) Appl. No.: 16/036,236

(22) Filed: Jul. 16, 2018

(65) Prior Publication Data

US 2019/0017814 A1    Jan. 17, 2019

(30) Foreign Application Priority Data

Jul. 17, 2017    (KR) ........................ 10-2017-0090438

(51) Int. Cl.
    *G01B 11/25*    (2006.01)
    *G06T 7/55*    (2017.01)
    *G06T 7/521*    (2017.01)

(52) U.S. Cl.
    CPC ........ *G01B 11/254* (2013.01); *G01B 11/2509* (2013.01); *G01B 11/2513* (2013.01); *G06T 7/521* (2017.01); *G06T 7/55* (2017.01)

(58) Field of Classification Search
    CPC .............. G01B 11/254; G01B 11/2509; G01B 11/2513; G06T 7/55; G06T 7/521
    See application file for complete search history.

(56) References Cited

U.S. PATENT DOCUMENTS

| 7,929,752 B2 * | 4/2011 | Je ........................ G01B 11/2509 382/154 |
| 2010/0188400 A1 * | 7/2010 | Chen .................. G01B 11/2509 345/420 |

(Continued)

FOREIGN PATENT DOCUMENTS

| KR | 1020050041523 | 5/2005 |
| KR | 1020100134403 | 12/2010 |
| KR | 1020110115508 | 10/2011 |

OTHER PUBLICATIONS

Horn, E., & Kiryati, N. (1999). Toward optimal structured light patterns. Image and Vision Computing, 17(2), 26 pages (Year: 1999).*

(Continued)

*Primary Examiner* — David F Dunphy
(74) *Attorney, Agent, or Firm* — Duane Morris LLP; J. Rodman Steele, Jr.; Gregory M. Lefkowitz (57) ABSTRACT

The present disclosure relates to a method for generating a monochrome permutation structured-light pattern and a structured-light system using the method, and the method for generating a monochrome structured-light pattern that is represented with two or more luminous intensities of a single color includes selecting two different luminous intensities of a single color, generating a stripe for each selected luminous intensity, apart from the two luminous intensities selected previously, generating at least one combination stripe by combining regions of two or more different luminous intensities that are identical to or different from the previously selected two luminous intensities, generating permutations using the generated stripes as elements, setting each permutation as a subpattern, and introducing permutation overlapping into the set subpatterns to generate a monochrome structured-light pattern in which each subpattern is connected in sequential overlapping manner.

20 Claims, 10 Drawing Sheets

(56) References Cited

U.S. PATENT DOCUMENTS

| | | | |
|---|---|---|---|
| 2015/0070473 A1* | 3/2015 | Wang | G01B 11/2509 |
| | | | 348/49 |
| 2017/0277187 A1* | 9/2017 | Refai | G06T 7/30 |
| 2018/0227571 A1* | 8/2018 | Page | H04N 13/161 |

OTHER PUBLICATIONS

Sagawa et al, "Grid-based Active Stereo with Single-colored Wave Pattern for Dense One-shot 3D Scan," 2012 Second Joint 3DIM/3DPVT Conference: 3D Imaging, Modeling, Processing, Visualization & Transmission, 8 pages (Year: 2012).*

Je et al., "Colour-Stripe Permutation Pattern for Rapid Structured-Light Range Imaging", Optics Communications, vol. 285, Issue 9, May 1, 2012, pp. 2320-2331.

Je et al., "High-Contrast Color-Stripe Pattern for Rapid Structured Light Range Imaging", Computer Vision (8th European Conference on Computer Vision, May 10, 2004, Proceedings, Part 1, pp. 95-107.

* cited by examiner

METHOD FOR GENERATING MONOCHROME PERMUTATION STRUCTURED-LIGHT PATTERN AND STRUCTURED-LIGHT SYSTEM USING THE METHOD THEREOF

CROSS-REFERENCE TO RELATED APPLICATIONS

This application claims priority to South Korean Patent Application No. 10-2017-0090438, filed on Jul. 17, 2017, the entire contents of which are incorporated herein by reference.

TECHNICAL FIELD

The present disclosure relates to structured-light technology to add a unique property or a pattern to light from a light source for 3-dimensional geometric information acquisition and image recognition, and more particularly, to a method for generating a monochrome structured-light patter, a recording medium having the method recorded thereon and a structured-light system using the method.

BACKGROUND

Optical methods for acquiring 3-dimensional (3D) geometric information may be largely classified into the passive vision and the active vision, and in general, the active vision achieves more accurate and rapid 3D geometric information acquisition than the passive vision. The active vision generally adopts a special light, and illuminates an identifiable light pattern onto a target surface using a laser or LCD/DLP projector, captures images of the target scene, and extracts 3D geometric information from the captured images. Prior art document presented below introduces technical means for acquiring depth information necessary for 3D broadcasting.

The light pattern illuminated according to the active vision may be a single point or a single line, and may be a very complex patter. When the illuminated light pattern is a single point or a single line, information carried on the light pattern is scanty, so a disadvantage is a small amount of 3D information that can be acquired from one image or any fixed number of images, and in contrast, when patterns in the shape of many points, lines or stripes are illuminated all at once, there is a disadvantage that it is difficult to distinguish each subpattern. Various methods using colors have been proposed to illuminate a large number of subpatterns all at once and effectively distinguish subpatterns, but they still have many problems including color inconsistency between original light patterns and its captured images, the influence of target surface color, and increased costs of hardware and software. Particularly, generation of color patterns itself requires high complexity and high costs, so it is desirable to use a monochrome pattern for development of low-cost depth sensors.

When a monochrome pattern is used, colors are fixed and only the luminous intensity can be adjusted, and thus it is very difficult to increase the number of identifiable subpatterns. Particularly, in order to prevent accuracy reduction caused by a low signal to noise ratio (SNR) like in the case of a continuous pattern such as a low-frequency sinusoidal pattern, and to improve the distinguishability between adjacent positions by high-SNR pattern imaging, it is desirable to use a binary pattern, in which the number of luminous intensity levels is limited to two. However, with a binary pattern, there is no method for effectively increasing the number of identifiable subpatterns in a single pattern image.

RELATED LITERATURES

Patent Literatures

Korean Patent Publication No. 10-2010-0134403, published Dec. 23, 2010, Electronics and Telecommunications Research Institute, Republic of Korea

SUMMARY

The present disclosure is aimed at, in the acquisition of 3-dimensional geometric information, solving the problem with the influence of color of an object itself or increased costs involved in the implementation when a conventional color patter is used, and overcoming the limitation confronted when increasing the number of identifiable subpatterns in case that a monochrome patter is adopted.

To solve the technical problem, a method for generating a monochrome structured-light pattern that is represented with two or more luminous intensities of a single color using at least one processor according to an embodiment of the present disclosure includes: selecting two different luminous intensities of a single color and generating a stripe for each selected luminous intensity; apart from the two luminous intensities, generating at least one combination stripe by combining regions of two or more different luminous intensities that are identical to or different from the two luminous intensities; generating permutations using the generated stripes as elements and setting each permutation as a subpattern; and introducing permutation overlapping into the set subpatterns to generate a monochrome structured-light patter in which each subpattern is connected in sequential overlapping manner.

In the method for generating a monochrome structured-light patter according to an embodiment, the monochrome structured-light pattern is preferably a monochrome pattern that can be represented by one scalar luminous intensity for each position.

In the method for generating a monochrome structured-light pattern according to an embodiment, the combination stripe is preferably a stripe formed by arranging monochrome regions of two or more different luminous intensities according to a preset rule.

In the method for generating a monochrome structured-light pattern according to an embodiment, the selecting two different luminous intensities of a single color may include selecting two luminous intensities of a single color such that the difference between the two luminous intensities is maximized.

In the method for generating a monochrome structured-light pattern according to an embodiment, the generating at least one combination stripe includes forming a combination stripe by repeatedly arranging two regions of inter-different luminous intensities in alternating manner.

In the method for generating a monochrome structured-light pattern according to an embodiment, the generating permutations using the generated stripes as elements and setting each permutation as a subpattern may include generating "permutations with repetition" where each two consecutive elements are inter-different using the generated stripes as elements according to a preset length, and setting each of the generated permutations with repetition as a subpattern.

In the method for generating a monochrome structured-light pattern according to an embodiment, the generating of the monochrome structured-light pattern may include selecting one of the set subpatterns as the first subpattern, searching for subpatterns starting with arrangement from the second stripe to the last stripe of the first subpattern, selecting one of the found subpatterns as the second subpattern and connecting the second subpattern to the first subpattern so that the stripes of the second subpattern except the last stripe overlap with from the second stripe to the last stripe of the first subpattern, and repeating this process to connect all the set subpatterns to generate a monochrome pattern in which the subpatterns are connected in sequential overlapping manner.

Further, hereinafter, there is provided a computer-readable recording medium having recorded thereon a program for executing the above-described method for generating a monochrome structured-light pattern in a computer.

To solve the technical problem, a structured-light system according to another embodiment of the present disclosure includes: a pattern providing unit including at least one processor to provide a monochrome structured-light pattern based on permutations so that a pattern is represented with two or more luminous intensities of a single color; a projection unit which projects the monochrome structured-light pattern provided through the pattern providing unit onto an object; an image acquisition unit which captures one or more images of the object including the projected monochrome structured-light pattern; and an image analysis unit which extracts information of the object by analyzing the monochrome structured-light pattern included in the captured images, wherein the monochrome structured-light pattern is provided by selecting two different luminous intensities of a single color, generating a stripe for each selected luminous intensity, apart from the above-described two luminous intensities, generating at least one combination stripe by combining regions of two or more different luminous intensities that are identical to or different from the above-described two luminous intensities, generating permutations using the generated stripes as elements, setting each permutation as a subpattern, and introducing permutation overlapping into the set subpatterns to generate a monochrome structured-light pattern in which each subpattern is connected in sequential overlapping manner.

In the structured-light system according to another embodiment, preferably, the monochrome structured-light pattern is a monochrome pattern that can be represented by one scalar luminous intensity for each position, and the combination stripe is a stripe formed by arranging monochrome regions of two or more different luminous intensities according to a preset rule.

In the structured-light system according to another embodiment, the pattern providing unit may select two luminous intensities of a single color such that the difference between the two luminous intensities is maximized.

In the structured-light system according to another embodiment, the pattern providing unit may form a combination stripe by repeatedly arranging two regions of inter-different luminous intensities in alternating manner.

In the structured-light system according to another embodiment, the patter providing unit may generate permutations with repetition where each two consecutive elements are inter-different using the generated stripes as elements according to a preset length, and set each of the generated permutations as a subpattern.

In the structured-light system according to another embodiment, the pattern providing unit may select one of the set subpatterns as the first subpattern, search for subpatterns starting with arrangement from the second stripe to the last stripe of the first subpattern, select one of the found subpatterns as the second subpattern and connect the second subpattern to the first subpattern so that the stripes of the second subpattern except the last stripe overlap with from the second stripe to the last stripe of the first subpattern, and repeat this process to connect all the set subpatterns to generate a monochrome pattern in which the subpatterns are connected in sequential overlapping manner.

In the structured-light system according to another embodiment, the image analysis unit may identify the monochrome structured-light pattern from the captured images, and estimate distortion or disparity of the projected monochrome structured-light patter on a surface of the object by comparing the identified monochrome structured-light pattern to an original monochrome structured-light patter. Additionally, the image analysis unit may extract depth information of the surface of the object from the estimated distortion or disparity of the monochrome structured-light patter. Further, the image analysis unit may visually display the geometric information estimated from the captured images by representing with changing colors depending on depth using the extracted depth information.

The embodiments of the present disclosure may significantly reduce the implementation costs and hardware complexity of structured light used for acquiring 3D geometric information through adoption of a monochrome pattern rather than a color pattern, and although a monochrome pattern is adopted, by expanding the number of identifiable patterns through permutations of simple and combination stripes, may accurately decode a monochrome structured-light pattern projected onto an object and acquire depth information therefrom even from a single image.

DETAILED DESCRIPTION OF EMBODIMENTS

[Je et al. 2004] Changsoo Je, Sang Wook Lee, and Rae-Hong Park, "High-Contrast Color-Stripe Pattern for Rapid Structured-Light Range Imaging," Computer Vision—ECCV 2004, LNCS 3021, pp. 95-107, Springer-Verlag Berlin Heidelberg, May, 2004.

[Je and Lee 2011] Changsoo Je and Sang Wook Lee, "Method for Generating Structured-Light Pattern," U.S. Pat. No. 7,929,752, Apr. 19, 2011.

[Je et al. 2012] Changsoo Je, Sang Wook Lee, and Rae-Hong Park, "Colour-Stripe Permutation Pattern for Rapid Structured-Light Range Imaging," Optics Communications, Volume 285, Issue 9, pp. 2320-2331, May, 2012.

As discussed earlier, the conventional color pattern-based structured-light techniques have problems with the influence of color of an object itself or increased costs involved in the implementation, and to overcome this drawback, an attempt to use a monochrome pattern was considered. However, when a monochrome pattern is adopted, it is difficult to increase the number of identifiable patterns. The reason is that in the case of a general monochrome patter, a binary pattern is frequently used. From the above studies, it was found that the general method for generating permutation-based stripe patterns, which can increase the number of identifiable subpatterns in a color-stripe pattern highly effectively is not helpful for the usual binary stripe structure, unfortunately. Accordingly, the present disclosure proposes a new stripe structure for increasing the number of subpatterns in a binary patter based on permutation.

Figure 1:
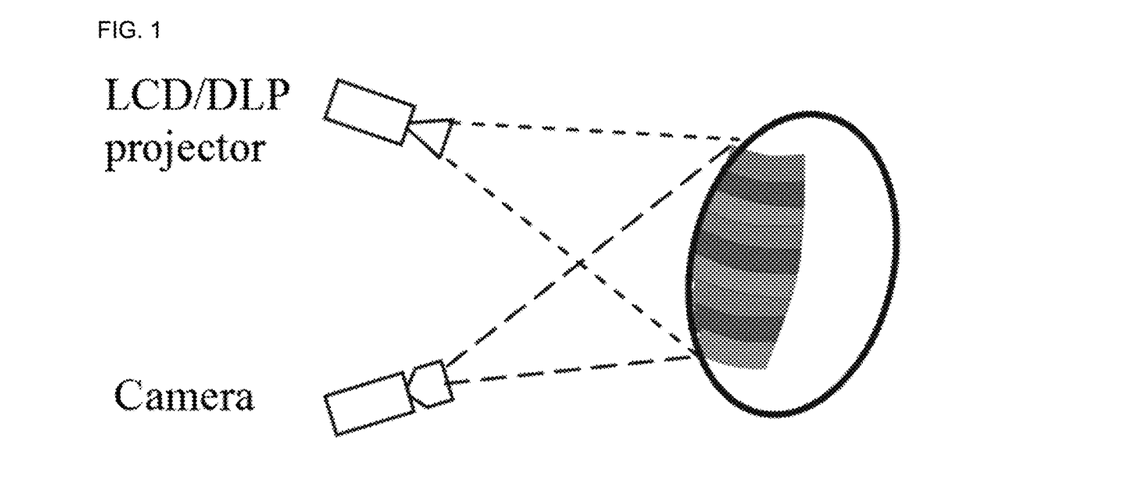
FIG. 1 is a diagram illustrating structured-light technology in active vision.

FIG. 1 is a diagram illustrating typical structured-light technology in active vision.

In structured-light technology that extracts 3-dimensional (3D) geometric information, a color structured-light method is known as suitable for high resolution data acquisition based on a single image. However, color structured-light has a disadvantage that it requires large, complex, and high-priced hardware such as a projector.

Accordingly, the embodiments of the present disclosure described below propose a monochrome structured-light pattern that achieves high resolution 3D data acquisition and can be commercialized at low costs and a depth information acquisition method and system based on the same.

Meanwhile, Kinect™ is widely spread by providing an innovative intelligent interface between humans and electronics. To acquire relatively accurate depth information in real time, it is necessary to acquire depth information from a single frame, and in view of computational complexity and production costs of products, technology that acquires depth information from an image (or images) using a suitable monochrome structured-light patter is required. For a depth sensor of Kinect v1, a random-dot pattern is used, and for a depth sensor of Kinect v2, time of flight (ToF) technology of ZCam is used.

The embodiments of the present disclosure propose a method that expands the shape of a stripe pattern to apply the permutation-based stripe pattern generation method to high density monochrome structured-light pattern fabrication, and with the obtained monochrome pattern, acquires 3D depth information from a single image.

Hereinafter, the embodiments of the present disclosure will be described in detail with reference to the accompanying drawings.

The monochrome structured-light pattern refers to a structured-light pattern that can be described as one relative scalar luminous intensity at a certain point on the structured-light pattern. For example, in the visible spectrum, the monochrome structured-light pattern may refer to a structured-light pattern composed of relative luminous intensities of any one of gray (including black-and-white), red, green and blue. When a green structured-light pattern is taken as an example of a monochrome structured-light pattern, it is presumed that the green structured-light pattern is composed of three luminous intensities, light green (relative luminous intensity: 1), dark green (relative luminous intensity: 0.5) and black (relative luminous intensity: 0). In the full electromagnetic spectrum, the monochrome structured-light pattern refers to a structured-light pattern that can be described as a relative scalar luminous intensity to an electromagnetic wave corresponding to a frequency or "a pair of a frequency interval and a spectral sensitivity".

The embodiments of the present disclosure describe a method for reconstructing a 3D geometric shape of a target scene based on a single image using a high density monochrome structured-light pattern. To generate a high density structured-light patter for acquiring a 3D shape with practical accuracy and resolution from a single image using a monochrome structured-light, the embodiments of the present disclosure describe generation of a permutation-based stripe pattern, and shape expansion of a stripe patter to overcome the limitation of the conventional monochrome structured-light.

The embodiments of the present disclosure do not pursue sequential projection of a plurality of patterns in reliance on synchronization between light and sensor, to present a high density monochrome structured-light patter for reliably acquiring a high resolution depth image in real time. Further, a disadvantage of sequential projection of a plurality of patterns is sensitivity to a temporal change of a target scene. Accordingly, technology for acquiring a high resolution depth image from a single image is proposed below.

Figure 2:
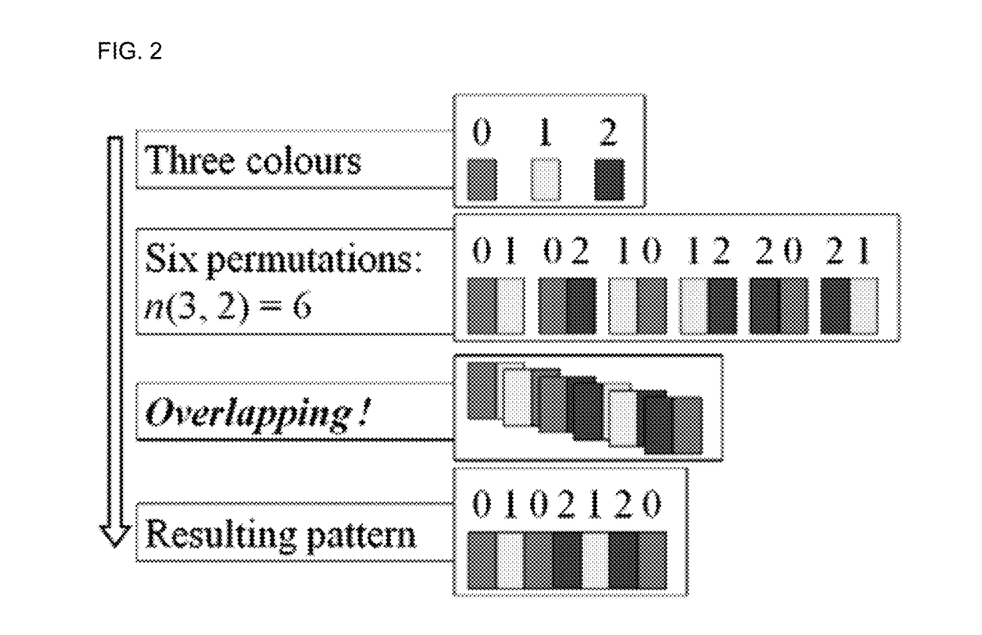
FIG. 2 is a diagram showing an example of color-stripe pattern generation by overlapping permutations with repetition.

FIG. 2 is a diagram showing an example of color stripe pattern generation by overlapping permutations with repetition, and the number of subpatterns given by the following Equation 1 may be generated according to the "permutations with repetition" encoding method of color stripes.

$$n(N,k) = N(N-1)^{k-1} \quad \text{[Equation 1]}$$

Here, N denotes the number of colors, and k denotes the number of stripes that form a subpattern (i.e., the length of a subpattern). Referring to FIG. 2, shown is a total of six subpatterns generated when three colors are used and the length of a permutation is 2.

Usually, a high resolution depth image may be generated by increasing the number of colors or k to increase the number of subpatterns. When the number of colors is 3 and the length of a subpattern is 7, 192 subpatterns are generated, and it is possible to acquire an image of high resolution depth. However, when the number of colors increases, the difference between used colors reduces, it results in an increase in sensitivity to changes in surface reflectance or ambient light, shading and noise, and consequential reduction in accuracy. In addition, when k increases, it results in an increase in sensitivity to surface discontinuity, and consequential reduction in accuracy. Accordingly, it is desirable to determine suitable N and k according to the characteristics of the target scene.

Figure 3:
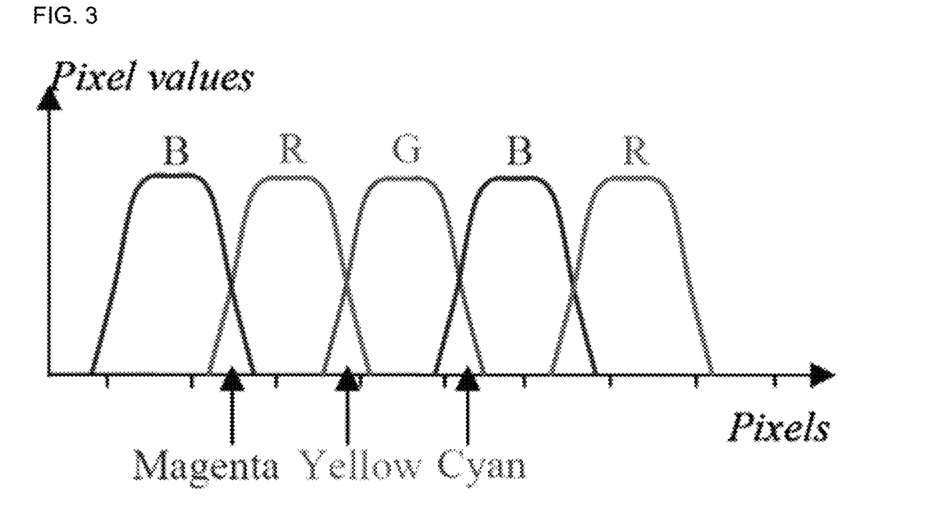
FIG. 3 is a diagram showing intensity profiles of an RGB stripe pattern illuminated scene.

However, in an attempt to generate a monochrome structured-light pattern for a low-cost depth sensor, increasing the number of subpatterns as in the above Equation 1 is usually impossible. A monochrome structured-light stripe pattern is frequently a binary pattern to increase recognition accuracy of the pattern. When an intermediate value of the two pixel values (black/white) of a binary pattern is used, it is impossible to distinguish a pixel of the intermediate value from pixels obtained around the boundary of black/white. FIG. 3 is a diagram showing intensity profiles of an RGB stripe pattern illuminated scene, and for example, shows intermediate colors created on the stripe boundary when only three colors R, G, B are used. That is, for a monochrome structured-light stripe pattern, it is assumed N=2 for maximizing recognition accuracy, and substituting this into the above Equation 1 yields the result given as Equation 2 below.

$$n(2,k)=2\cdot(2-1)^{k-1}=2 \qquad \text{[Equation 2]}$$

That is, it dearly shows the limitation that the number of identifiable subpatterns is 2 no matter how much the k value increases.

Accordingly, the embodiments of the present disclosure intended to adopt a monochrome structured-light pattern intend to design a novel stripe structure by expanding the structure of a stripe pattern to go beyond the number of identifiable stripe elements (two scalar luminous intensities of the conventional binary pattern), and through this, to increase the number of subpatterns.

Figure 4:
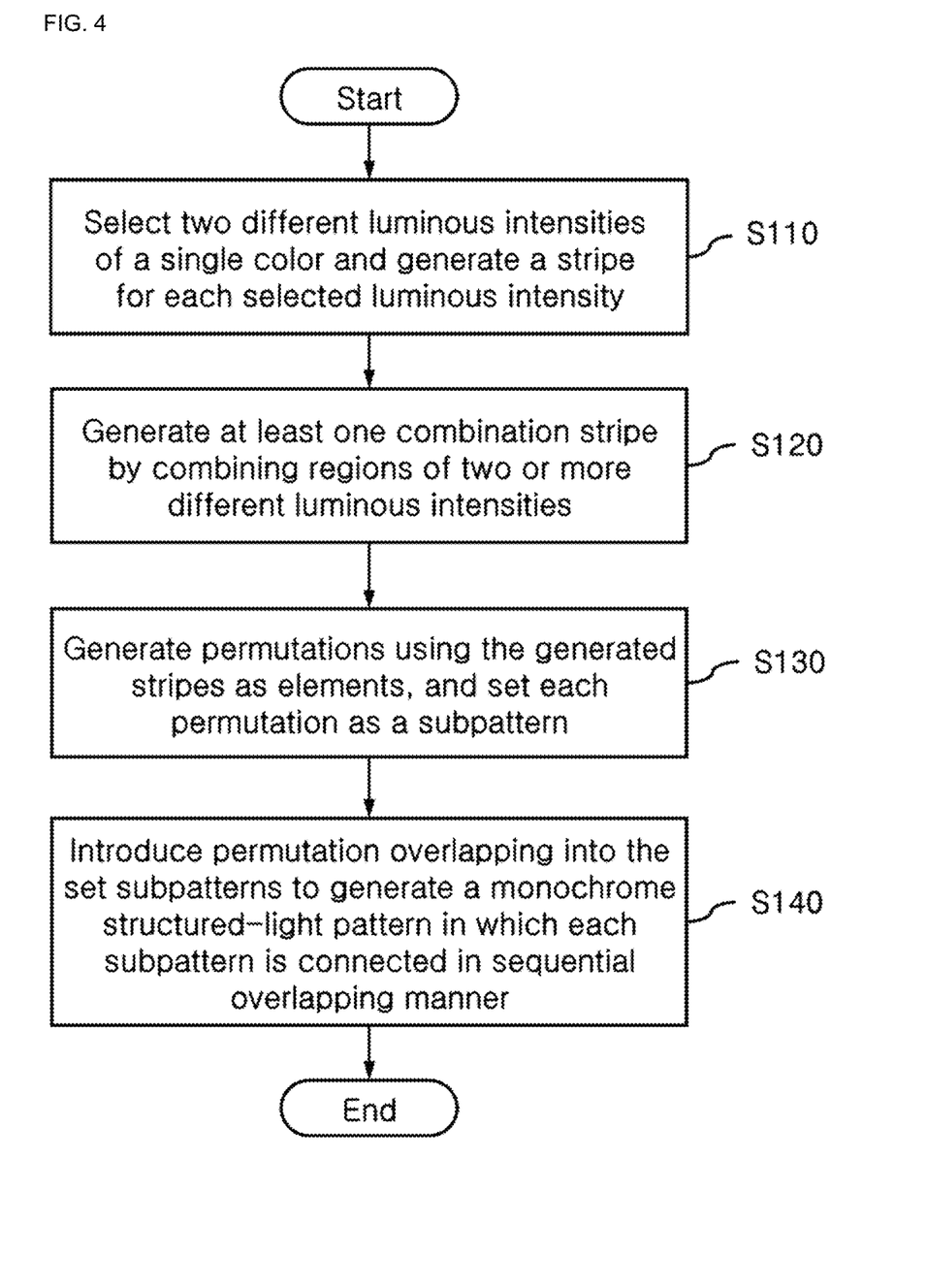
FIG. 4 is a flowchart showing a method for generating a monochrome structured-light pattern according to an embodiment of the present disclosure.

FIG. 4 is a flowchart showing a method for generating a monochrome structured-light pattern according to an embodiment of the present disclosure, in which a pattern is represented with two or more luminous intensities of a single color using at least one processor, and although a monochrome structured-light is used, technical means is provided to expand the number of identifiable stripe elements to at least 3. Here, the monochrome structured-light pattern refers to a monochrome pattern that can be represented by one scalar luminous intensity for each position. For reference, by contrast, a color structured-light pattern needs to be represented as a combination of two or more scalar luminous intensities at a certain position on the pattern. In the case of structured-light generation by general RGB color channels, a color structured-light pattern needs to be represented as luminous intensities of three RGB color channels at a certain position, i.e., a combination of three luminous intensities.

In S110, two different luminous intensities of a single color are selected, and a stripe is generated for each selected luminous intensity. Additionally, in S110 for stripe generation, two luminous intensities of a single color such that the difference between the two luminous intensities is maximized are selected, helping the acquisition of more accurate geometric information.

For example, in a monochrome structured-light stripe pattern, two different stripes may be generated using two luminous intensities, black and white. In this case, a black stripe corresponds to the luminous intensity of an achromatic stripe being zero (or close to 0). As indicated previously, with only two monochrome stripes, there is a problem that the number of identifiable subpatterns is fixed to 2, and to overcome this limitation, the following process is performed.

In S120, at least one combination stripe is generated by combining regions of two or more different luminous intensities. In this instance, apart from the two luminous intensities selected through the previous step S110, two or more different luminous intensities that are identical to or different from the above two luminous intensities are selected and combined to generate a new combination stripe. That is, through the combination stripe, even in case the number of scalar luminous intensities represented physically in practice is 2 (for example, black/white), the number of identifiable stripe elements may be substantially 3 or more, i.e., N may be 3 or more. This combination stripe is a preferably a stripe formed by arranging monochrome regions of two or more different luminous intensities according to a preset rule.

Figure 5:
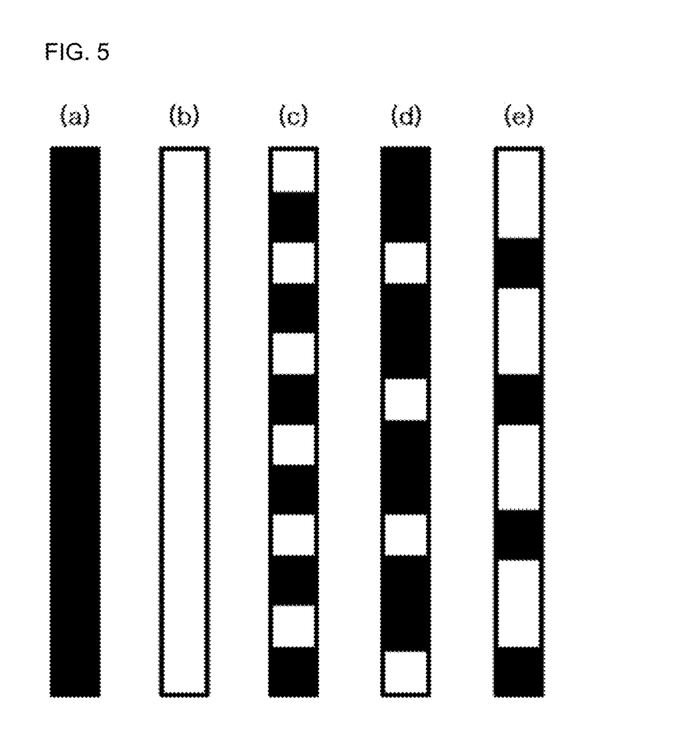
FIG. 5 is a diagram showing stripes drawn from two different scalar luminous intensities of a single color, which is achromatic in this example.

More specifically, in S120 for combination stripe generation, a combination stripe may be formed by repeatedly arranging two regions of inter-different luminous intensities in alternating manner. Referring to FIG. 5 showing stripes drawn from two different scalar luminous intensities of a single color, which is achromatic in this example, it can be seen that a black stripe of (A) and a white stripe of (B) are shown as stripes generated through S110, and stripes having a repeated arrangement of black and white in (C) to (E) are shown as stripes generated through S120. Those having ordinary skill in the technical field pertaining to the present disclosure may additionally generate a variety of other combination stripes that are different from the combination stripes presented in FIG. 5 through modification to selection of luminous intensities and arrangement of regions of the luminous intensities.

Returning to FIG. 4, in S130, permutations are generated using the generated stripes as elements, and each permutation is set as a subpattern. More specifically, a method for generating the permutations may be implemented by finding permutations with repetition having a preset (or required) length from given elements. That is, permutations with repetition where each two consecutive elements are inter-different may be generated using the generated stripes as elements according to a preset length, and each of the generated permutations may be set as a subpattern.

A "permutation with repetition" refers to a permutation of selected elements of a set where repetition is allowed, and the number of permutations with repetition is given by the following Equation 3.

$$n\Pi r = n^r \qquad \text{[Equation 3]}$$

Here, n is the number of different elements, and r is the length of a permutation with repetition.

Accordingly, when an element is a stripe, a generated permutation with repetition is a sequence of stripes. For example, permutations with repetition may be generated by selecting elements among at least three elements, a black stripe, a white stripe and a combination stripe formed by repetition of black and white regions. In this case, a sequence of black stripe and white stripe (the length is 2) or a sequence of a combination stripe, a black stripe, and another black stripe (the length is 3) are examples of generated permutations with repetition. Any two permutations with repetition including the same elements in combination, but having different orders of arrangement of the elements are obviously different from each other. To generate a proper stripe structured-light pattern, each two adjacent stripes are usually forced to be inter-different to make distinguishable stripes. Each permutation with repetition generated in this way is used as a subpattern. In the embodiments of the present disclosure, the number of subpatterns may be determined by the following Equation 4.

$$N(N-1)^{k-1} \qquad \text{[Equation 4]}$$

Here, N is the number of identifiable stripe elements, and k is the length of a subpattern. Equation 4 is, in fact, identical to Equation 1 introduced previously. For the above-described color stripe pattern, N is the number of identifiable colors and is equal to the number of color stripe elements, whereas for the monochrome stripe pattern of Equation 4 proposed by the embodiments of the present disclosure, N is the number of identifiable stripe elements and is different from the number of luminous intensities used. Particularly, the value of N may be at least 3 by S120, and even when the number of luminous intensities actually used is 2, the number of identifiable stripe elements may be substantially 3 or more, and this effect makes difference.

In S140, permutation overlapping is introduced into the set subpatterns to generate a monochrome structured-light patter in which each subpattern is connected in sequential overlapping manner. More specifically, a process of generating the monochrome structured-light pattern includes selecting one of the set subpatterns as the first subpattern, searching for subpatterns starting with arrangement from the second stripe to the last stripe of the first subpattern, selecting one of the found subpatterns as the second subpattern and connecting the second subpattern to the first subpattern so that the stripes of the second subpattern except the last stripe overlap with from the second stripe to the last stripe of the first subpattern, and repeating this process to connect all the set subpatterns to generate a monochrome pattern in which the subpatterns are connected in sequential overlapping manner. That is, a monochrome structured-light pattern is generated by connecting the subpatterns in continuously overlapping manner such that the first stripes of any two consecutive subpatterns are off by one stripe, so that for any continuously overlapping two subpatterns the overlapping parts have identical arrangement.

When the monochrome structured-light patter is formed as described above, the total number of stripes that form the monochrome structured-light pattern may be determined by the following Equation 5.

$$N(N-1)^{k-1}+k-1 \quad \text{[Equation 5]}$$

Here, N is the number of identifiable stripe elements, and k denotes the length of a subpattern. Particularly, by the step S120, the value of N may be at least 3, because the number of identifiable stripe elements may be 3 or more even when the number of luminous intensities actually used is 2.

Figure 6:
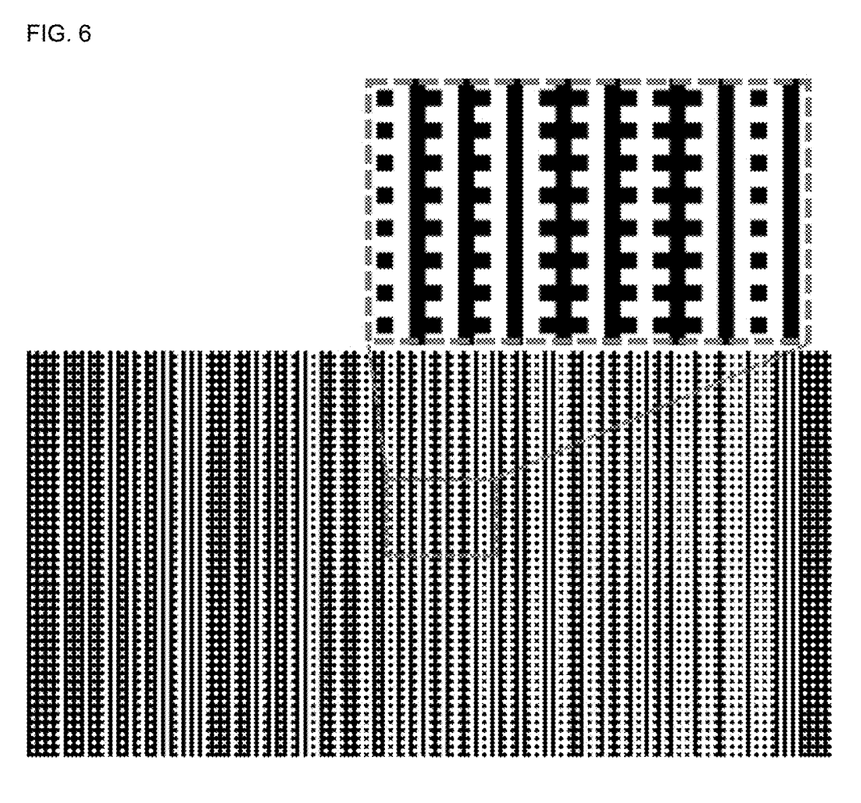
FIG. 6 is a diagram showing a monochrome structured-light pattern adopted by the embodiments of the present disclosure.

FIG. 6 is a diagram showing the monochrome structured-light pattern adopted by the embodiments of the present disclosure, which can be described as a relative scalar luminous intensity of a single color (here, white) at a certain position. Referring to FIG. 6, there are two relative scalar luminous intensities, which may be represented in 0 (black) and 1 (white). However, by expanding the vertical direction stripe structure, the identifiable stripes are three stripes, $\hat{1}$ a black stripe, $\hat{2}$ a white stripe and $\hat{3}$ a stripe formed by repetition of black and white. These stripes correspond to elements of permutations. Accordingly, it is possible to effectively increase the number of identifiable subpatterns by the Equation 4.

The structured-light patter of FIG. 6 is an example of a monochrome structured-light pattern generated by selecting k as 7. Among the three kinds of stripes, the stripe composed of black alone and the stripe composed of white alone are geometrically similar to stripes in typical color structured-light patterns. However, the permutation-based structured-light stripe pattern implemented by additionally using the stripe formed by repetition of black and white includes the stripe structure newly proposed through the embodiments of the present disclosure, and the important feature is that it is not fully described as one color or one relative scalar luminous intensity like the conventional type of stripe, and can be only represented as two or more different luminous intensities or two or more different colors. Specially, this new type of stripes in an example of the monochrome structured-light pattern adopted by the embodiments of the present disclosure can be described as a combination of two different luminous intensities.

Figure 7:
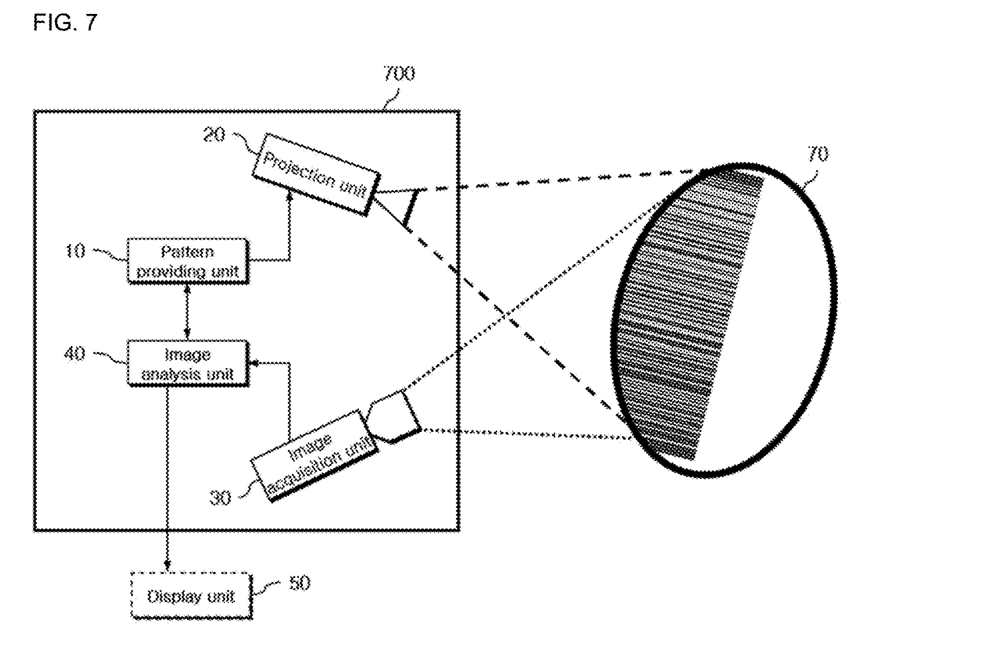
FIG. 7 is a block diagram showing a structured-light system using a monochrome structured-light pattern according to another embodiment of the present disclosure.

FIG. 7 is a block diagram showing a structured-light system 700 using a monochrome structured-light pattern according to another embodiment of the present disclosure, and proposes technical means for acquiring 3D geometric information of an object 70 using the method for generating a monochrome structured-light patter of FIG. 4.

A patter providing unit 10 includes at least one processor (not shown), and provides a monochrome structured-light pattern based on permutations so that a pattern is represented with two or more luminous intensities of a single color.

More specifically, the monochrome structured-light pattern may be provided by selecting two different luminous intensities of a single color, generating a stripe for each selected luminous intensity, apart from the two luminous intensities, generating at least one combination stripe by combining regions of two or more different luminous intensities that are identical to or different from the two luminous intensities, generating permutations using the generated stripes as elements, setting each permutation as a subpattern, and introducing permutation overlapping into the set subpatterns to generate a monochrome structured-light patter in which each subpattern is connected in sequential overlapping manner. Here, the monochrome structured-light pattern refers a monochrome pattern that can be represented by one scalar luminous intensity for each position, and the combination stripe refers to a stripe formed by arranging monochrome regions of two or more different luminous intensities according to a preset rule.

Particularly, the pattern providing unit 10 may select two luminous intensities of a single color such that the difference between the two luminous intensities is maximized, generate a stripe for each selected luminous intensity, and repeatedly arrange two or more regions of inter-different luminous intensities in alternating manner to form a combination stripe.

Additionally, the pattern providing unit 10 may generate permutations with repetition where each two consecutive elements are inter-different using the generated stripes as elements according to a preset length, and set each of the generated permutations as a subpattern. Subsequently, the pattern providing unit 10 may select one of the set subpatterns as the first subpattern, search for subpatterns starting with arrangement from the second stripe to the last stripe of the first subpattern, select one of the found subpatterns as the second subpattern and connect the second subpattern to the first subpattern so that the stripes of the second subpattern except the last stripe overlap with from the second stripe to the last stripe of the first subpattern, and repeat this process to connect all the set subpatterns to generate a monochrome pattern in which the subpatterns are connected in sequential overlapping manner.

The projection unit 20 projects the monochrome structured-light pattern provided through the pattern providing unit 10 onto the object 70. Because the embodiments of the present disclosure adopt the monochrome structured-light pattern, there are advantages that the projection unit can be implemented with simpler structure and at lower implementation costs than the conventional color structured-light pattern.

An image acquisition unit 30 captures one or more images of the object scene 70 including the projected monochrome structured-light pattern. Additionally, the adoption of the monochrome structured-light pattern can achieve light-weight and low cost of hardware for image acquisition.

An image analysis unit 40 extracts information of the object scene 70 by analyzing the monochrome structured-light pattern included in the captured images.

The image analysis unit 40 identifies a stripe element of the monochrome structured-light pattern by analyzing at least one luminous intensity and at least one directional gradient of luminous intensity at each position of the captured images, and through this, identifies a subpattern at each position.

The image analysis unit 40 may identify the monochrome structured-light pattern from the captured images, and estimate distortion or disparity of the projected monochrome structured-light pattern on the surface of the object by comparing the identified monochrome structured-light pattern to an original monochrome structured-light pattern. Subsequently, the image analysis unit 40 may extract depth information of the surface of the object from the estimated distortion or disparity of the monochrome structured-light pattern. The geometry estimation results of the surface of the captured object may be visually displayed through a separate display unit 50 by representing the geometry with changing color or brightness values depending on depth values using the depth information extracted by the image analysis unit 40.

Hereinafter, the experimental results for a decoding process of the monochrome structured-light pattern image will be descried through FIGS. 8 to 10.

Figure 8:
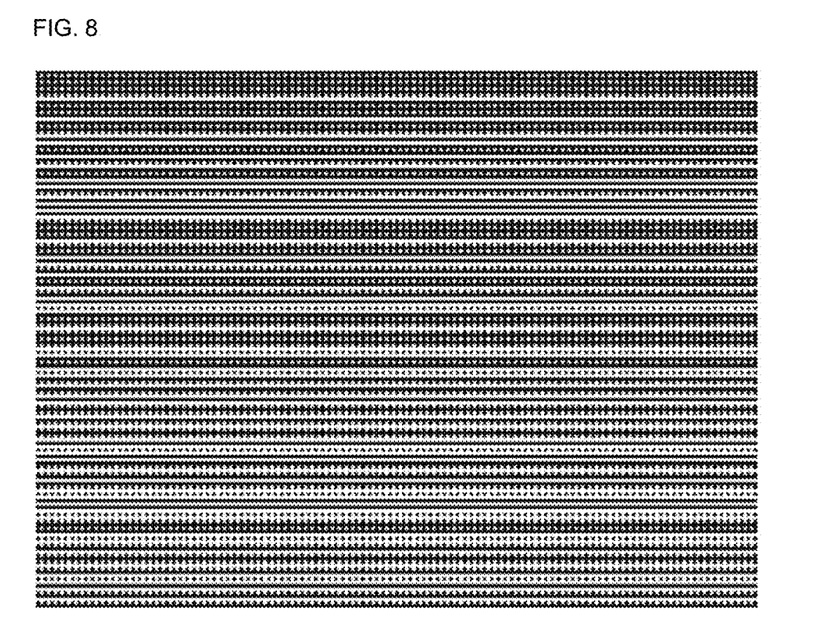
FIGS. 8 to 10 are diagram showing the experimental results for a decoding process of a monochrome structured-light pattern image.
Figure 9:
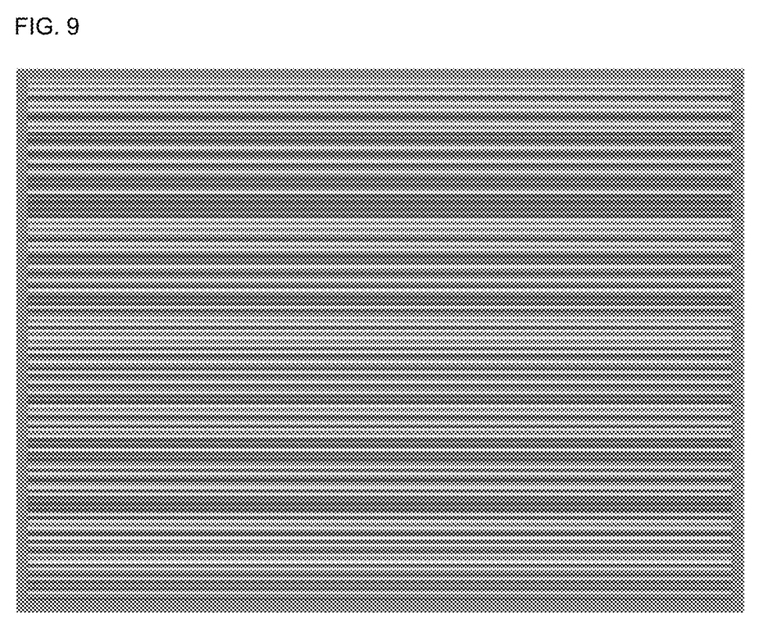

FIG. 8 is a diagram showing the result of simply rotating and resizing the monochrome structured-light pattern image for a decoding test of the image, and FIG. 9 is a diagram showing the stripe segmentation result of the image shown in FIG. 8. Referring to FIG. 9, in the stripe segmentation result image of the simply rotated and resized image of the monochrome structured-light pattern image proposed by the embodiments of the present disclosure, it can be seen that the original stripe is accurately segmented. The original image of FIG. 8 is a black-and-white image, but the image of FIG. 9 is originally a false-color image to clearly show the stripe segmentation result (but the image is degenerated in gray).

Figure 10:
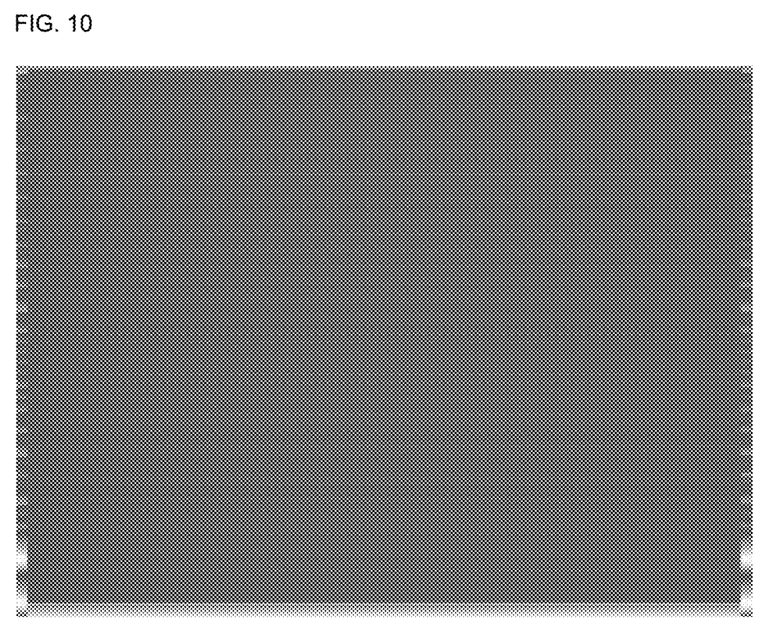

FIG. 10 is a diagram showing the result of extracting depth information after decoding the structured-light pattern from the stripe segmentation result shown in FIG. 9. Referring to FIG. 10, shown is an image as a result of extracting depth information after decoding the structured-light pattern from the stripe segmentation result of the simply rotated and resized image of the monochrome structured-light pattern image proposed by the embodiments of the present disclosure, and it can be seen that plane geometry estimation is possible. In the image of FIG. 10, depth is represented originally in sinusoidal color (then degenerated in gray).

Figure 11:
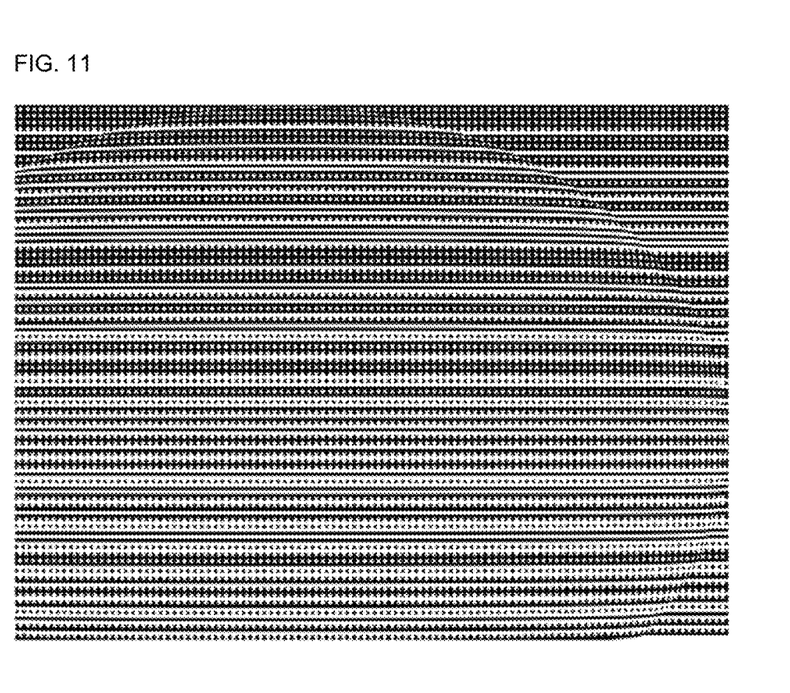
FIGS. 11 to 13 are diagrams showing the experimental results for an image of elliptic surface distortion of a monochrome structured-light pattern.
Figure 12:
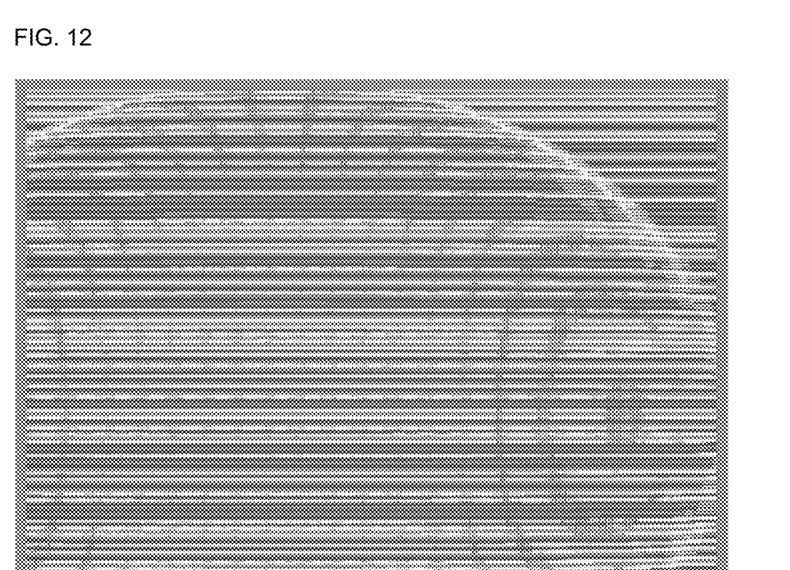
Figure 13:
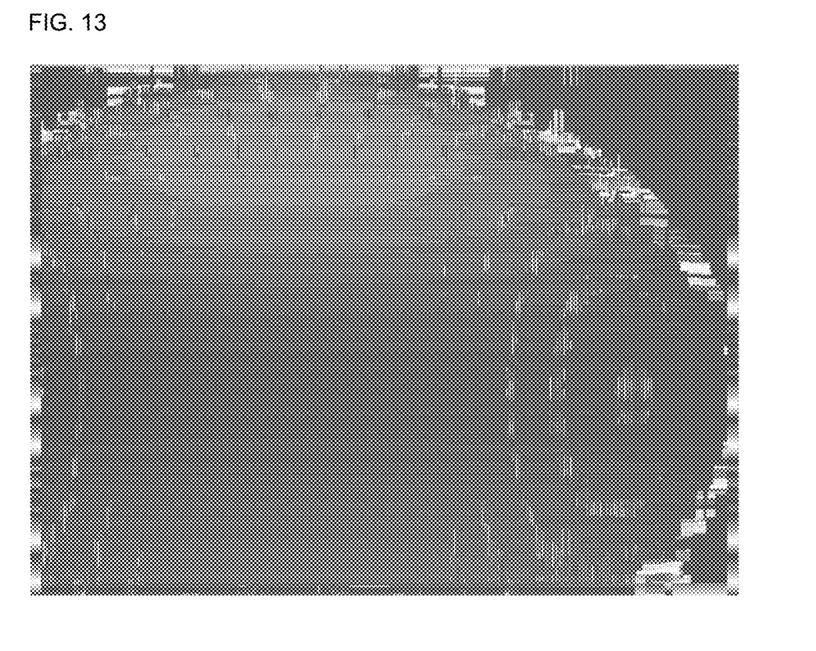

FIGS. 11 to 13 show the experimental results for an image of elliptic surface distortion of a monochrome structured-light pattern.

FIG. 11 is an image as a result of applying rotation and resizing and elliptic surface distortion to the monochrome structured-light pattern image. Referring to FIG. 11, in the image as a result of applying rotation and resizing and elliptic surface distortion to the monochrome structured-light pattern image proposed by the embodiments of the present disclosure, spatial movement of the stripe pattern by elliptic surface distortion is observed.

FIG. 12 shows a stripe segmentation result image of the image as a result of applying rotation and resizing and elliptic surface distortion to the monochrome structured-light pattern image. Referring to FIG. 12, in the stripe segmentation result image of the image as a result of applying rotation and resizing and elliptic surface distortion to the monochrome structured-light pattern image proposed by the embodiments of the present disclosure, it can be seen that accurate stripe segmentation is achieved through most of pixels. The color in the image of FIG. 12 is originally false-color to clearly show the stripe segmentation result (but the image is degenerated in gray).

FIG. 13 is an image as a result of extracting depth information after decoding the structured-light pattern from the result of applying rotation and resizing and elliptic surface distortion to the monochrome structured-light pattern image. Referring to FIG. 13, in the image as a result of extracting depth information after decoding the structured-light pattern from the result of applying rotation and resizing and elliptic surface distortion to the monochrome structured-light pattern image proposed by the embodiments of the present disclosure, it can be seen that estimation of curved surface geometry is possible. Likewise, in the image of FIG. 13, depth is represented originally in sinusoidal color (then degenerated in gray).

Figure 14:
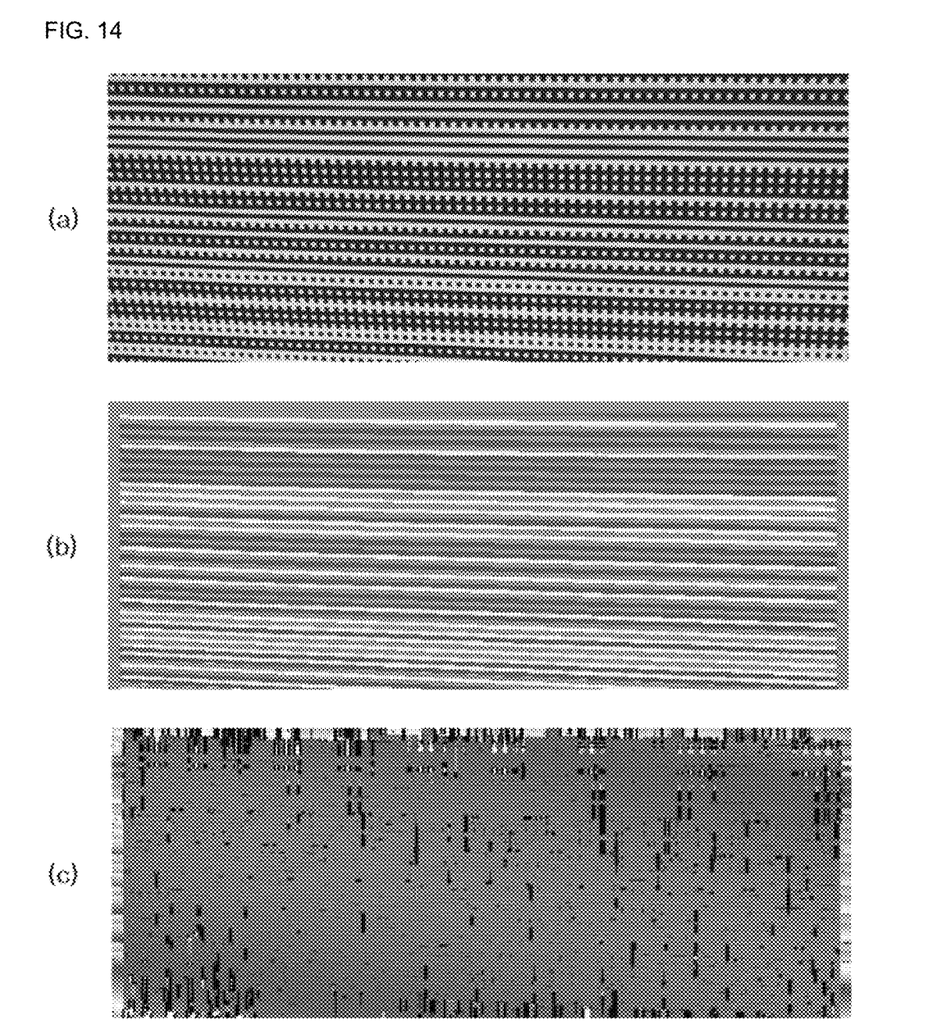
FIG. 14 is a diagram showing the experimental results for an image of a slightly curved surface onto which a monochrome structured-light pattern is projected.

FIG. 14 is a diagram showing the experimental results for an image of a slightly curved surface onto which a monochrome structured-light pattern projected.

(A) shows an image of formed by taking a scene in which the monochrome structured-light pattern is projected onto a slightly curved surface, (B) shows a stripe segmentation result image of the image in (A), in which color is originally false-color for clearly showing the stripe segmentation result (but the image is degenerated in gray). Referring to the image of (B), it can be seen that stripe segmentation is accurately accomplished through most of pixels. (C) shows an image as a result of extracting depth information after decoding the structured-light pattern from the stripe segmentation result of an image captured by illuminating the monochrome structured-light pattern, in which depth is represented originally in sinusoidal color (then degenerated in gray). The depth image of (C) is obtained from a single image, and it can be seen that accurate decoding is accomplished through most of pixels.

According to the above-described embodiments of the present disclosure, it is possible to significantly reduce the implementation costs and hardware complexity of structured-light used for acquiring 3D geometric information through adoption of the monochrome pattern, and although the monochrome pattern was adopted, by increasing the number of identifiable stripe elements to 3 or more through the use of at least one combination stripe made by combining regions of two or more different luminous intensities, it is possible to significantly increase the number of identifiable subpatterns, and through this, even with only a single image, to accurately decode the monochrome structured-light pattern projected onto the object scene and acquire high resolution depth information from it.

Meanwhile, as proposed by the embodiments of the present disclosure, the method for generating a monochrome structured-light pattern that is represented with two or more luminous intensities of a single color by controlling at least one processor may be implemented in a computer-readable code on computer-readable recording media. The computer-readable recording media includes any type of recording device for storing data that can be read by a computer system.

Examples of the computer-readable recording media include ROM, RAM, CD-ROM, magnetic tape, floppy disk, and optical data storing devices. Additionally, the computer-readable recording media is distributed over computer systems connected via a network so that computer-readable codes may be stored and executed in distributed manner. Additionally, functional programs, codes and code segments for realizing the present disclosure may be easily inferred by programmers in the technical field to which the present disclosure belongs.

Various embodiments of the present disclosure have been hereinabove described. Those having ordinary skill in the technical field to which the present disclosure belongs will be able to understand that the present disclosure may be embodied in modified form without departing from the nature of the present disclosure. Therefore, the disclosed embodiments should be appreciated in illustrative sense, not in limited sense. The scope of the present disclosure is defined by the appended claims, not the foregoing description, and it should be interpreted that the present disclosure covers all changes within the equivalent scope.

DETAILED DESCRIPTION OF MAIN ELEMENTS

700: Structured-light system
10: Pattern providing unit
20: Projection unit
30: Image acquisition unit
40: Image analysis unit
50: Display unit
70: Object

What is claimed is:

1. A pattern generation method for generating a monochrome structured-light pattern that is represented with two or more luminous intensities of a single color using at least one processor, the pattern generation method comprising:
selecting two different luminous intensities of a single color and generating a stripe for each selected luminous intensity;
generating at least one combination stripe by combining regions of two or more different luminous intensities;
generating permutations using the generated stripes as elements and setting each permutation as a subpattern; and
introducing permutation overlapping into the set subpatterns to generate a monochrome structured-light pattern in which each subpattern is connected in sequential overlapping manner.

2. The pattern generation method according to claim 1, wherein the monochrome structured-light pattern is a monochrome pattern that can be represented by one scalar luminous intensity for each position.

3. The pattern generation method according to claim 1, wherein the combination stripe is a stripe formed by arranging monochrome regions of two or more different luminous intensities according to a preset rule.

4. The pattern generation method according to claim 1, wherein the selecting two different luminous intensities of a single color includes selecting two luminous intensities of a single color such that the difference between the two luminous intensities is maximized.

5. The pattern generation method according to claim 1, wherein the generating at least one combination stripe includes forming a combination stripe by repeatedly arranging two regions of inter-different luminous intensities in alternating manner.

6. The pattern generation method according to claim 1, wherein the generating permutations using the generated stripes as elements and setting each permutation as a subpattern includes generating permutations with repetition where each two consecutive elements are inter-different using the generated stripes as elements according to a preset length, and setting each of the generated permutations as a subpattern.

7. The pattern generation method according to claim 6, wherein the number of subpatterns is $N(N-1)^{k-1}$, where N is the number of identifiable stripe elements and is at least 3, and k is the length of a subpattern.

8. The pattern generation method according to claim 6, wherein permutations with repetition are generated by selecting elements among at least three elements, a black stripe, a white stripe and a stripe formed by repetition of black and white regions.

9. The pattern generation method according to claim 1, wherein the generating of the monochrome structured-light pattern includes selecting one of the set subpatterns as the first subpattern, searching for subpatterns starting with arrangement from the second stripe to the last stripe of the first subpattern, selecting one of the found subpatterns as the second subpattern and connecting the second subpattern to the first subpattern so that the stripes of the second subpattern except the last stripe overlap with from the second stripe to the last stripe of the first subpattern, and repeating this process to connect all the set subpatterns to generate a monochrome pattern in which the subpatterns are connected in sequential overlapping manner.

10. The pattern generation method according to claim 9, wherein the total number of stripes that form the monochrome structured-light pattern is $N(N-1)^{k-1}+k-1$, N is the number of identifiable stripe elements and is at least 3, and k is the length of a subpattern.

11. A non-transitory computer-readable recording medium having recorded thereon a program for executing the method according to claim 1 in a computer.

12. A structured-light system comprising:
a pattern providing unit including at least one processor to provide a monochrome structured-light pattern based on permutations so that a pattern is represented with two or more luminous intensities of a single color;
a projection unit which projects the monochrome structured-light pattern provided through the pattern providing unit onto an object;
an image acquisition unit which captures one or more images of the object including the projected monochrome structured-light pattern; and
an image analysis unit which extracts information of the object by analyzing the monochrome structured-light pattern included in the captured images,
wherein the monochrome structured-light pattern is provided by selecting two different luminous intensities of a single color, generating a stripe for each selected luminous intensity, generating at least one combination stripe by combining regions of two or more different luminous intensities, generating permutations using the generated stripes as elements, setting each permutation as a subpattern, and introducing permutation overlapping into the set subpatterns to generate a monochrome structured-light pattern in which each subpattern is connected in sequential overlapping manner.

13. The structured-light system according to claim 12, wherein the monochrome structured-light pattern is a monochrome pattern that can be represented by one scalar luminous intensity for each position, and
the combination stripe is a stripe formed by arranging monochrome regions of two or more different luminous intensities according to a preset rule.

14. The structured-light system according to claim 12, wherein the pattern providing unit selects two luminous intensities of a single color such that the difference between the two luminous intensities is maximized, and generates a stripe for each selected luminous intensity.

15. The structured-light system according to claim 12, wherein the pattern providing unit forms a combination stripe by repeatedly arranging two regions of inter-different luminous intensities in alternating manner.

16. The structured-light system according to claim 12, wherein the pattern providing unit generates permutations with repetition where each two consecutive elements are inter-different using the generated stripes as elements according to a preset length, and sets each of the generated permutations as a subpattern.

17. The structured-light system according to claim 12, wherein the pattern providing unit selects one of the set subpatterns as the first subpattern, searches for subpatterns starting with arrangement from the second stripe to the last stripe of the first subpattern, selects one of the found subpatterns as the second subpattern and connects the second subpattern to the first subpattern so that the stripes of the second subpattern except the last stripe overlap with from the second stripe to the last stripe of the first subpattern, and repeats this process to connect all the set subpatterns to generate a monochrome pattern in which the subpatterns are connected in sequential overlapping manner.

18. The structured-light system according to claim 12, wherein the image analysis unit identifies the monochrome structured-light pattern from the captured images, and estimates distortion or disparity of the projected monochrome structured-light pattern on a surface of the object by comparing the identified monochrome structured-light pattern to an original monochrome structured-light pattern.

19. The structured-light system according to claim 18, wherein the image analysis unit extracts depth information of the surface of the object from the estimated distortion or disparity of the monochrome structured-light pattern.

20. The structured-light system according to claim 12, wherein the image analysis unit identifies a stripe element of the monochrome structured-light pattern by analyzing at least one luminous intensity and at least one directional gradient of luminous intensity at each position of the captured images, and through this, identifies a subpattern at each position.

* * * * *